(12) United States Patent
Kawasaki

(10) Patent No.: US 6,684,344 B1
(45) Date of Patent: Jan. 27, 2004

(54) CONTROL UNIT OF EXTERNAL STORAGE, METHOD FOR SUBSTITUTING DEFECTIVE BLOCK, AND STORAGE MEDIUM WHEREIN CONTROL PROGRAM FOR SUBSTITUTING DEFECTIVE BLOCK HAS BEEN STORED

(75) Inventor: Tetsuharu Kawasaki, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/431,254

(22) Filed: Nov. 1, 1999

(30) Foreign Application Priority Data

Oct. 30, 1998 (JP) .......................................... 10-326106

(51) Int. Cl.[7] .............................................. G06F 11/00
(52) U.S. Cl. ................................ 714/8; 714/6; 714/7
(58) Field of Search ............................. 714/7, 8, 5, 42, 714/702, 710, 718, 763, 6, 45, 54

(56) References Cited

U.S. PATENT DOCUMENTS

| | | | |
|---|---|---|---|
| 5,105,427 A | * 4/1992 | Ando | 714/710 |
| 5,287,363 A | * 2/1994 | Wolf et al. | 714/718 |
| 5,761,411 A | * 6/1998 | Teague et al. | 714/42 |
| 5,802,069 A | * 9/1998 | Coulson | 714/718 |
| 5,828,583 A | * 10/1998 | Bush et al. | 702/185 |
| 5,968,182 A | * 10/1999 | Chen et al. | 714/5 |
| 6,169,710 B1 | * 1/2001 | Arai | 369/30.11 |
| 6,332,204 B1 | * 12/2001 | Russell | 714/10 |
| 6,384,999 B1 | * 5/2002 | Schibilla | 360/53 |
| 6,434,711 B1 | * 8/2002 | Takiyanagi | 714/8 |

FOREIGN PATENT DOCUMENTS

| | | |
|---|---|---|
| JP | 60-129976 | 7/1985 |
| JP | 60-231982 | 11/1985 |
| JP | 61-271672 | 12/1986 |
| JP | 62-52762 | 3/1987 |
| JP | 1-107371 | 4/1989 |
| JP | 7-3027 | 1/1995 |

OTHER PUBLICATIONS

NB9206325, "Predictive Failure Analysis of Reassign Rate", Jun. 1, 1992, IBM Technical Disclosure Bulletin, vol. 35 Issue 1B, pp. 325–326.*
NB9206323, "Predictive Failure Analysis of Hardware Errors", Jun. 1, 1992, IBM Technical Disclosure Bulletin, vol. 35 Issue 1B, pp. 323–324.*

* cited by examiner

Primary Examiner—Robert Beausoliel
Assistant Examiner—Gabriel Chu
(74) Attorney, Agent, or Firm—Foley & Lardner

(57) ABSTRACT

For controlling an external storage having a block in which a datum is recorded, a control unit includes a read monitoring arrangement for monitoring whether or not failure occurs in reading the datum from the block in a data reading section. When the data reading section succeeds in reading the datum after occurrence of the failure, a data control arrangement controls the datum to be recorded in a substitute block.

7 Claims, 2 Drawing Sheets

CONTROL UNIT OF EXTERNAL STORAGE, METHOD FOR SUBSTITUTING DEFECTIVE BLOCK, AND STORAGE MEDIUM WHEREIN CONTROL PROGRAM FOR SUBSTITUTING DEFECTIVE BLOCK HAS BEEN STORED

BACKGROUND OF THE INVENTION

The present invention relates to a control unit for controlling use of an external storage and, more particularly, to a control unit of an external storage for protecting data written to a defective location if a fault occurs in the external storage, a method for substituting a defective block, and a storage medium wherein a control program for substituting a defective block has been stored.

If reading data from an external storage of a magnetic disk device or the like fails due to some cause, there are some cases wherein the data is successfully and properly read on a retry of reading the data from the same block of a storage such as a magnetic disk. Although, however, the reading succeeded on the second try at that time, the block wherein such a reading failure has occurred may incur an uncorrectable fault and prevent data reading no matter how many times retry may repeated in the future, depending on the nature of a cause of the reading failure.

In conventional control of access to an external storage, even when reading data from a desired block failed, the block was considered to be free of faults and data was left stored in the unstable block if the reading was successfully performed on a retry. For this reason, the data stored in the block was lost if an uncorrectable fault occurs in the block.

As set forth above, the conventional control of access to an external storage has been presenting a shortcoming in that, even if reading data from a desired block fails, the block of the storage medium is regarded as normal if reading the data is successful on a retry, and the unstable block is left uncorrected; hence, the data recorded in the block is lost if a fault that cannot be corrected by retries on the block takes place.

SUMMARY OF THE INVENTION

It is therefore an object of the present invention to provide a control unit for an external storage, an access control method of controlling access to the external storage, and a storage medium recording a control program therein for controlling the access, that are capable of preventing loss of data if an uncorrectable fault occurs in a block when reading the data stored in the predetermined block on a storage medium fails, but reading the data is successful on a retry.

Other objects of the present invention will become clear as the description proceeds.

According to the present invention, there is provided a control unit for an external storage having a block in which a datum is recorded. The control unit comprises a data reading section connected to the external storage for reading the datum from the block, read monitoring means connected to the external storage for monitoring whether or not failure occurs in reading the datum from the block, and data control means connected to the external storage and the read monitoring means for controlling the datum to be recorded in the substitute block when the data reading section succeeds in reading the datum after occurrence of the failure.

According to the present invention, there is provided an access control method of controlling access to an external storage having a block in which a datum is recorded. The access control method comprises the steps of reading the datum from the block, monitoring whether or not failure occurs in reading the datum from the block, and controlling the datum to be recorded in a substitute block in response to success in reading the datum after occurrence of the failure.

According to the present invention, there is provided a storage medium in which a control program is recorded for controlling a data processor of a computer system as regards access to an external storage having a block recording a datum therein. The control program represents a method comprising the steps of reading the datum from the block, monitoring whether or not failure occurs in reading the datum from the block, and controlling the datum to be recorded in a substitute block in response to success in reading the datum after occurrence of the failure.

DESCRIPTION OF THE PREFERRED EMBODIMENT

Figure 1:
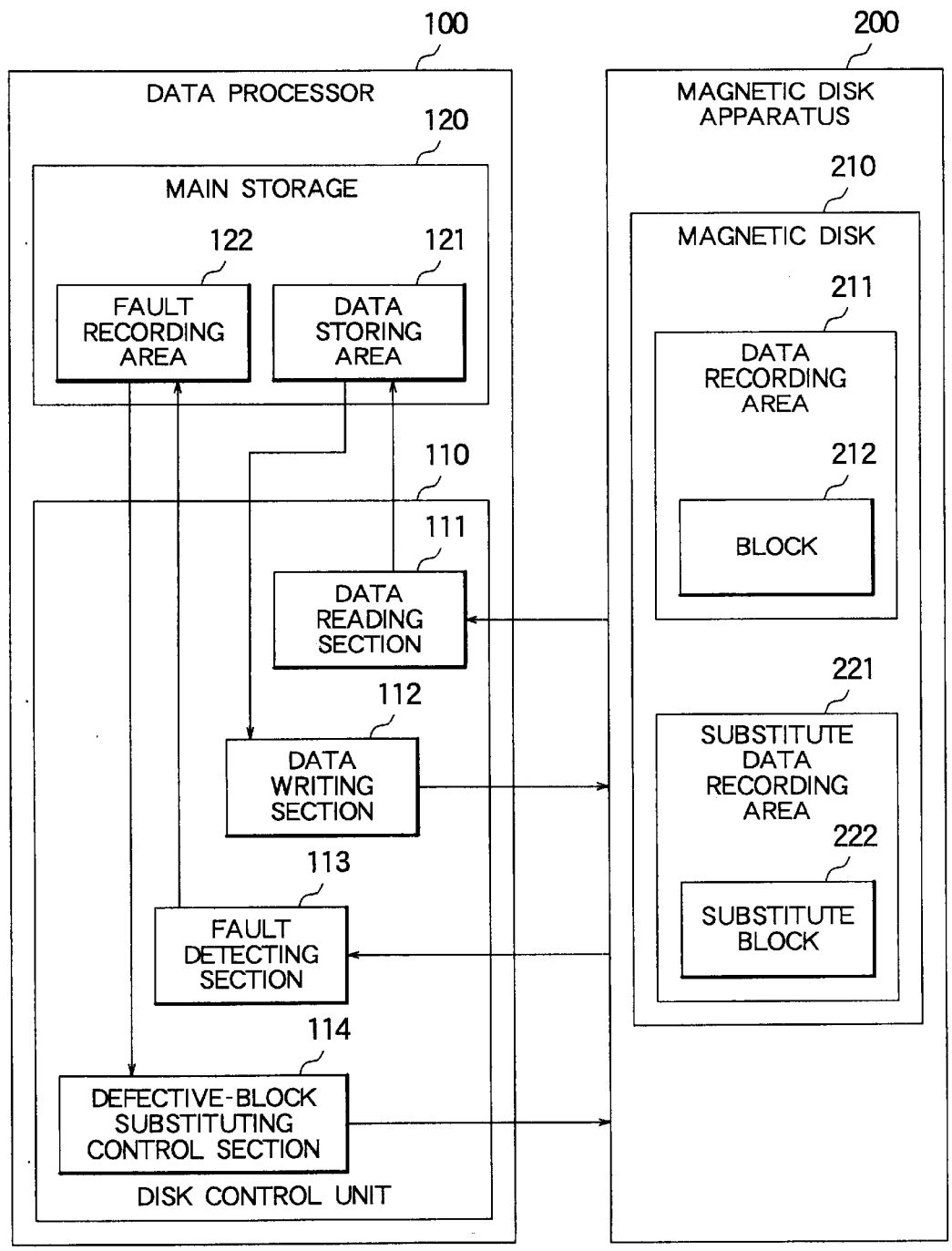
FIG. 1 is a block diagram showing a configuration of a control unit according to an embodiment of the present invention.

Referring to FIG. 1, a disk control unit according to an embodiment of this invention is implemented by a data processor 100 in a personal computer, a workstation, or other computer system. The data processor 100 has a CPU and a main storage 120 such as a RAM or other storage, and implements functions of the disk control unit 110 by controlling the CPU by a computer program loaded in the main storage 120. The computer program controlling the CPU is provided by being stored in a general storage medium such as a magnetic disk, an optical disk, a semiconductor memory, etc.

A magnetic disk apparatus 200 is connected, as an external storage, to the data processor 100. A magnetic disk 210, which is a storage medium, is set on the magnetic disk apparatus 200. The following will describe a case wherein access to the magnetic disk apparatus 200 is controlled. It is a matter of course that each of the data processor 100 and the magnetic disk apparatus 200 includes a general configuration in the manner known in the art, although the general configuration is omitted from the figure.

The disk control unit 110 has a data reading section 111 that reads desired data recorded in the magnetic disk 210 of the magnetic disk apparatus 200 connected to the data processor 100, a data writing section 112 that writes data to the magnetic disk 210, a fault detecting section 113 that detects the occurrence of a failure of reading/writing data from/to the magnetic disk 210 by the data reading section 111 and the data writing section 112, and a defective-block substituting control section 114 that carried out a substituting operation for a defective block on the magnetic disk 210 if a failure of data reading/writing from/to the magnetic disk 210 is detected by the fault detecting section 113.

In the main storage 120 of the data processor 100, a data storing area 121 for storing data read from the magnetic disk 210 and a fault recording area 122 for storing a data reading failure detection history by the fault detecting section 113 are set.

In the configuration described above, the data reading section 111 reads desired data from a predetermined block 212 in a data recording area 211 set in the magnetic disk 210 of the magnetic disk apparatus 200 and stores it in the data storing area 121 of the main storage 120. The data writing section 112 reads predetermined data from the data storing area 121 and writes it to the magnetic disk 210 of the magnetic disk apparatus 200. The same operations apply to a case wherein the data processor 100 performs normal operation, and a case wherein data stored in a block on the magnetic disk 211 is saved by the disk control unit 110.

The fault detecting section 113 monitors reading/writing data from/to the magnetic disk 210 by the data reading section 111 and the data writing section 112, and detects a failure of reading/writing of data. A failure of reading/writing data is detected by, for example, judging a value of sense data obtained by a request sense command if the magnetic disk apparatus 200 is connected to the data processor 100 via SCSI.

If a data reading failure is detected, the fault detecting section 113 records a detection history of the data reading failure in the fault storing area 122 of the main storage 120. The detection history recorded in the fault storing area 122 is referred to when data reading is performed by the data reading section 111 so as to be used for determining whether reading the data has failed in the past.

When data recorded in the data recording area 211 of the magnetic disk 210 needs to be saved, that is, when a defective block 212 is present in the data recording area 211 of the magnetic disk 210, the defective-block substituting control section 114 controls the reading unit 111 and the data writing section 112 to save the data. To be more specific, the defective-block substituting control section 114 controls the data reading section 111 to read data from the defective block 212 and store it in the data storing area 121 of the main storage 120, and also secures a substitute data recording area 221 separately from the data recording area 211 in the magnetic disk 210. And a predetermined block of the substitute data recording area 221 is set as a substitute block 222. Then, the data writing section 112 is controlled to read data from the data storing area 121 of the main storage 120 and write it to the substitute block 222.

Whether or not the defective block 212 is present in the magnetic disk 210 can be determined by checking, when data is read by the data reading section 111, whether a detection history of a reading failure regarding the data has been stored in the fault recording area 122 of the main storage 120. More specifically, if reading data fails once and succeeds on a retry, then referring to the fault recording area 122 reading on the successful retry will always reveal the presence of the failure detection history of the data; therefore, it is possible to determine that the block 212 where the data has been stored is a defective block. Furthermore, if writing of data to the magnetic disk 210 by the data writing section 112 fails, the block 212 to which the data is to be written can be immediately determined to be a defective block.

Figure 2:
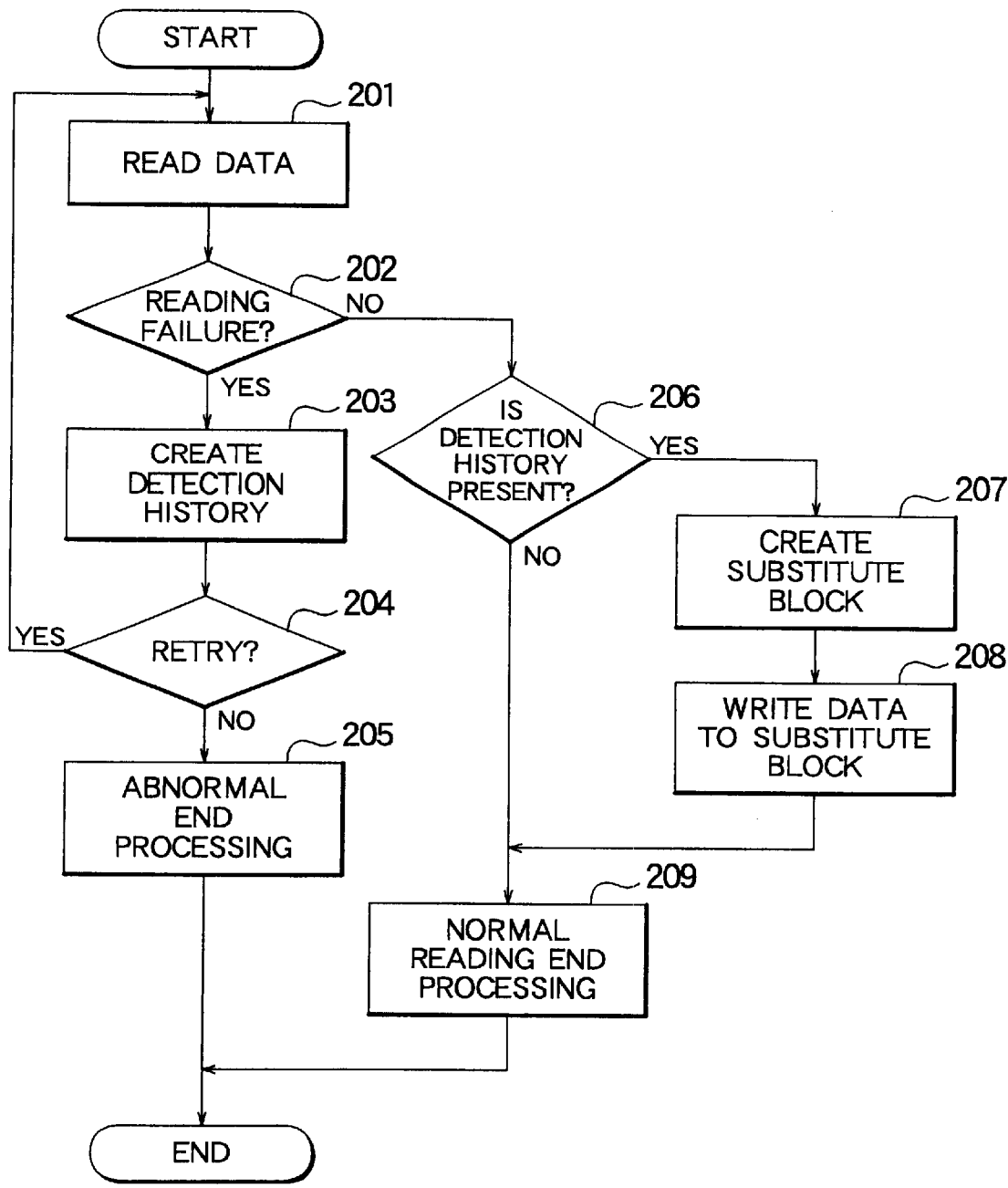
FIG. 2 is a flow chart showing an operation of the embodiment.

Referring now to a flow chart of FIG. 2, the description will be made as regards a control program or an operation of the control unit. At first, the data reading section 111 reads data from the predetermined block 212 of the data recording area 211 of the magnetic disk 210 and stores it in the data storing area 121 of the main storage 120 (step 201). At this time, the fault detecting section 113 monitors whether or not failure occurs in reading the data from the block 212 (step 202). On carrying out the step 202, the fault detecting section 113 is operable as a read monitoring arrangement.

If reading the data fails, then the fault detecting section 113 detects it and stores a detection history in the fault recording area 122 of the main storage 120 (step 203). On carrying out the step 203, the fault recording area 122 is operable as a failure recording arrangement.

Subsequently, it is determined whether reading the data should be retried (step 204). Whether the retry should be performed can be decided arbitrarily by a user. Normally, a retry is carried out when data reading fails. If, however, the number of retries exceeds a predetermined number of times, then any more retries will be wasteful; hence, settings may be made to prevent any more retries.

If no more retry is made, then the user will be notified, by such a means as outputting an error message, of an abnormal end of data reading, and the processing will be terminated (step 205).

When reading data by the data reading section 111 is successful, the defective-block substituting control section 114 checks whether a reading failure detection history regarding the data has been stored in the fault recording area 122 of the main storage 120 (step 206). On carrying out the step 206, the defective-block substituting control section 114 is operable as a history judging arrangement which produces a particular signal when the failure is recorded in the fault recording area 122. A combination of the history judging arrangement, the failure recording arrangement, and the data writing section is referred to as a data control arrangement.

If a reading failure detection history regarding the data has been stored in the fault recording area 122 of the main storage 120, then the defective-block substituting control section 114 determines that the block 212 wherein the data has been stored is a defective block. And the defective-block substituting control section 114 controls the magnetic disk apparatus 200 to secure the substitute data recording area 221 in the magnetic disk 210, and sets a predetermined block in the substitute data recording area 221 as a substitute block 222 of the defective block 212 (step 207). In other wards, the defective-block substituting control section 114 creates the substitute block 222 in response to the particular signal. On carrying out the step 207, the defective-block substituting control section 114 is operable as a block creating arrangement.

Furthermore, the defective-block substituting control section 114 controls the data writing section 112 to store the data, which has been stored in the data storing area 121 of the main storage 120, in the substitute block 222 (step 208). If the substitute data recording area 221 has already been secured in the magnetic disk 210, then it is unnecessary to secure any additional similar area; a predetermined block of the already prepared substitute data recording area 221 can be used as the substitute block 222 for the data.

After the foregoing operations, the program returns to normal processing that is applied when reading of data has been normally terminated. If reading of data is successful and no reading failure history regarding the data has been stored in the fault recording area 122 of the main storage 120, then it means that the block 212 wherein the data has been stored is completely normal; therefore, the program directly proceeds to normal processing (steps 206 and 209).

The control unit of an external storage, the method for substituting a defective block, and a storage medium wherein a control program of substituting a defective block has been stored provide the following advantage. If reading/writing of data from/to an external storage fails and an uncorrectable fault may occur in a block wherein the data has been stored, then a substitute block for the block is created and the data that has been stored in the block is moved to the substitute block, thereby preventing loss of the data.

While the present invention has thus far been described in connection with a single embodiment thereof, it will readily be possible for those skilled in the art to put this invention into practice in various other manners. For example, if writing of data to the magnetic disk 210 fails, then it is possible to immediately determine that the block 212 to which the data is to be written is a defective block, create the substitute data recording area 221 and the substitute block 222 according to the procedure indicated by steps 207 and 208 of FIG. 2, and write the data to the substitute block 222. Furthermore, the control program may be recorded in a storage medium known in the art. More particularly, a data reading/writing failure can be detected and data can be saved in the same manner also for access control applied to external storages employing diverse types of storage media that permit reading/writing data.

What is claimed is:

1. A control unit for an external storage having a block in which datum is recorded, said control unit comprising:
   a data reading section connected to said external storage for reading said datum from said block;
   read monitoring means connected to said external storage for monitoring whether or not a failure occurred in reading said datum from said block; and
   data control means connected to said external storage and said read monitoring means for controlling said datum to be recorded in a substitute block when said data reading section succeeds in reading said datum after occurrence of said failure
   wherein said data control means comprises:
      failure recording means connected to said read monitoring means for recording a history of said failure whenever said failure occurs in reading said datum;
      history judging means connected to said failure recording means and said read monitoring means and responsive to said success in reading said datum for judging whether or not said failure is recorded on said failure recording means; and
      a data writing section connected to said history judging means for writing said datum in said substitute block when said history judging means judges that said failure is recorded on said failure recording means.

2. A control unit as claimed in claim 1, wherein said history judging means produces a particular signal when said failure is recorded on said failure recording means, said data control means further comprising block creating means connected to said history judging means for creating said substitute block in response to said particular signal.

3. A control unit as claimed in claim 2, wherein said substitute block is included in said external storage.

4. An access control method of controlling access to an external storage having a block in which datum is recorded, said access control method comprising the steps of:
   reading said datum from said block;
   monitoring whether or not a failure occurred in reading said datum from said block; and
   controlling said datum to be recorded in a substitute block in response to success in reading said datum after occurrence of said failure
   wherein the controlling step comprises the steps of:
      recording a history of said failure whenever occurrence of said failure;
      judging whether or not said failure is recorded; and
      writing said datum in said substitute block when judges that said failure is recorded.

5. An access control method as claimed in claim 4, wherein the controlling step further comprises the step of creating said substitute block in response to said success in reading said datum when said failure is recorded.

6. A storage medium in which a control program is recorded for controlling a data processor of a computer system as regards access to an external storage having a block recording datum therein, said control program representing a method comprising the steps of:
   reading said datum from said block;
   monitoring whether or not a failure occurred in reading said datum from said block; and
   controlling said datum to be recorded in a substitute block in response to success in reading said datum after occurrence of said failure
   wherein the controlling step comprises the steps of:
      recording a history of said failure whenever occurrence of said failure;
      judging whether or not said failure is recorded; and
      writing said datum in said substitute block when judges that said failure is recorded.

7. A storage medium as claimed in claim 6, wherein the controlling step further comprises the step of creating said substitute block in response to said success in reading said datum when said failure is recorded.

* * * * *